Feb. 4, 1947. W. A. DE VIGIER 2,415,236
ADJUSTABLE CENTERING AND LIKE SUPPORTS
Filed Dec. 29, 1944 2 Sheets-Sheet 1
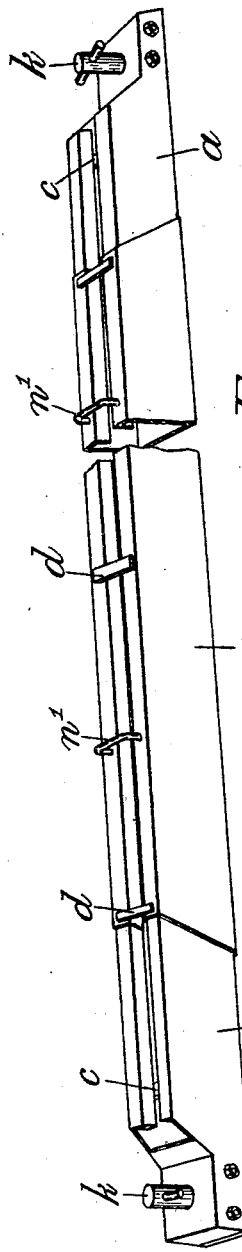
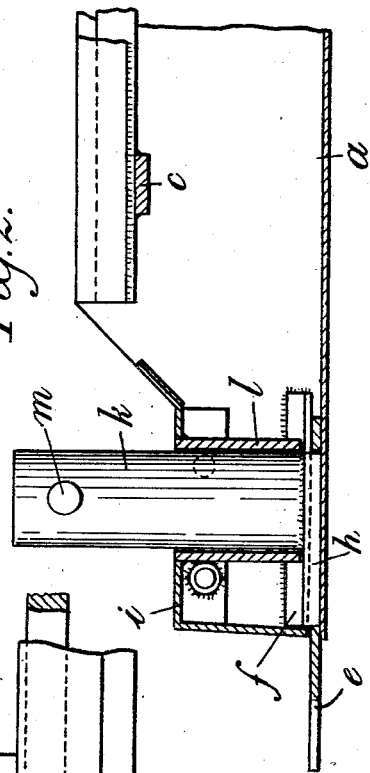
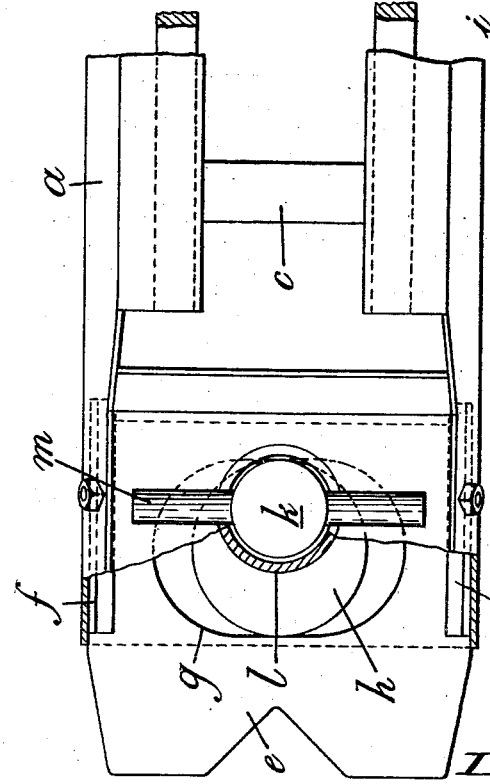
Inventor
W. A. de Vigier Patented Feb. 4, 1947

2,415,236

UNITED STATES PATENT OFFICE 2,415,236

ADJUSTABLE CENTERING AND LIKE SUPPORTS

William Alphonse de Vigier, Northwood, England

Application December 29, 1944, Serial No. 570,406
In Great Britain June 1, 1944

4 Claims. (Cl. 189—37)

This invention relates to adjustable centering and like supports for use in the construction of fire-resisting floors or in other constructional operations with particular reference to supports of the kind formed of telescopic interfitting members and having projecting tongues, lugs or lips at the ends by means of which the support may be carried upon bearing beams or walls or other supports during use.

Hitherto the tongues or the like have been formed integral with the telescopic members with the result that the whole of the member carrying the tongues must be moved when the tongues are to be withdrawn from the structure for removal of the support after use and consequently considerable force must be exerted by the aid of a tommy bar or other lever with consequent damage or risk of damage to the support and/or structure. Moreover, should the support be allowed to fall or be otherwise subjected to rough usage with consequent breakage of or damage to the tongues or the like, the whole telescopic member carrying such tongues becomes unusable and must be replaced by another.

The object of the present invention is to obviate the above drawbacks and disadvantages of adjustable supports as hitherto proposed or adopted and according to my invention I form the tongues or projections on separate plates or members retractable into the main body of the support with the result that not only are the tongues protected against damage when the support is not in use but also only the part carrying the tongues requires to be moved when the tongues are to be withdrawn from the structure to permit removal of the support and this can be easily accomplished without the use of excessive force. Further, in the unlikely event of the tongues or the like becoming damaged or broken all that is necessary is to substitute a new part formed with tongues and the main supporting beam still remains available for use.

The invention also consists in the provision of a rotary cam or eccentric or other mechanical means for effecting the protrusion or retraction of the part carrying the tongues or the like.

Further features of the invention will be apparent from the description given hereafter.

The accompanying drawings illustrate one mode of carrying out the invention.

Figure 1 is a perspective plan view showing the underneath of a support in accordance with the invention.

Figure 2 is a sectional elevation on a somewhat larger scale of one end of the support shown in Figure 1.

Figure 3 is a plan of Figure 2 with a part broken away, and

In carrying my invention into effect in one convenient manner I may form my improved support from any number of interfitting telescopically arranged open section channel members $a$, $b$, the free margins of which may be tied transversely at intervals (as by the ties $c$, $d$) to resist spreading or collapse, the construction being, for example, similar to that described and claimed in the specification of British Patent No. 479,594. It will, however, be understood that any other convenient construction and section of telescopic members made from sheet metal or other suitable material may be adopted although I prefer the open cross-sectional shape for the reason that access to the interior may be readily obtained for cleaning and repairs (such as removal of dents which would otherwise prevent the relative telescopic movement) and also because members of open cross sectional shape are more readily adjusted relatively to one another than with closed section constructions.

Figure 5:
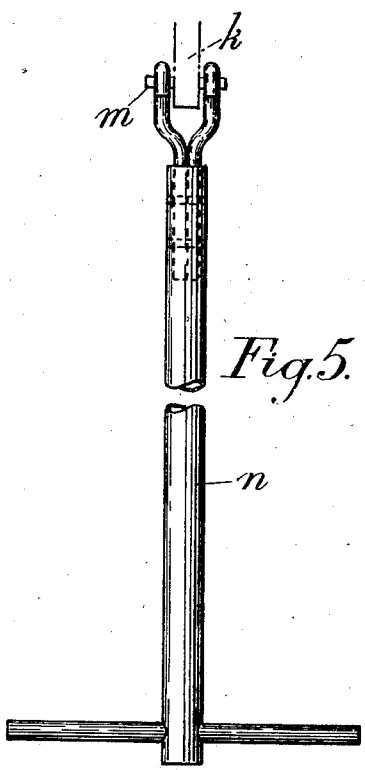
Figure 5 is a view in elevation of a tool used to retract the bearer plates.

Each of the lips or tongues provided at the ends of the beam for the support thereof upon beams, joists, or other parts of the structure is formed in a flat plate, $e$, of spring steel or other suitable material, and of a size such that it may be slid within slides or guides at the end of the beam member. The slides may, for example, be formed by the securing of angle members $f$ to the inside of the side flanges at the end of the member $a$ or in any other suitable manner. The tongue plate is formed with an aperture $g$ in which engages a cam or eccentric $h$ carried in a sheet metal or other suitable frame $i$ which may be bolted or otherwise secured to the aforesaid side walls of the beam member so that the whole forms as it were a box within which the tongue plate may be retracted (as shown in Figure 1) by rotation of the cam or eccentric and thus the tongues will be completely protected from damage when the support is not in use. The cam or eccentric may be formed with or secured upon a shaft $k$ rotatably mounted in a bush $l$ in the aforesaid frame $i$ and projecting therethrough, a pin $m$ being passed transversely through the projecting end of the shaft so that it may be engaged by means of a hook-ended steel or other rod $n$ (Figure 5) by means of which the shaft $k$ may be rotated.

The telescopic members may be provided with suitable carrying handles $n'$ and the said handles, in conjunction with the projecting cam heads $k$, provide ready means by which the length of the support may be readily adjusted to that required for use.

Figure 4:
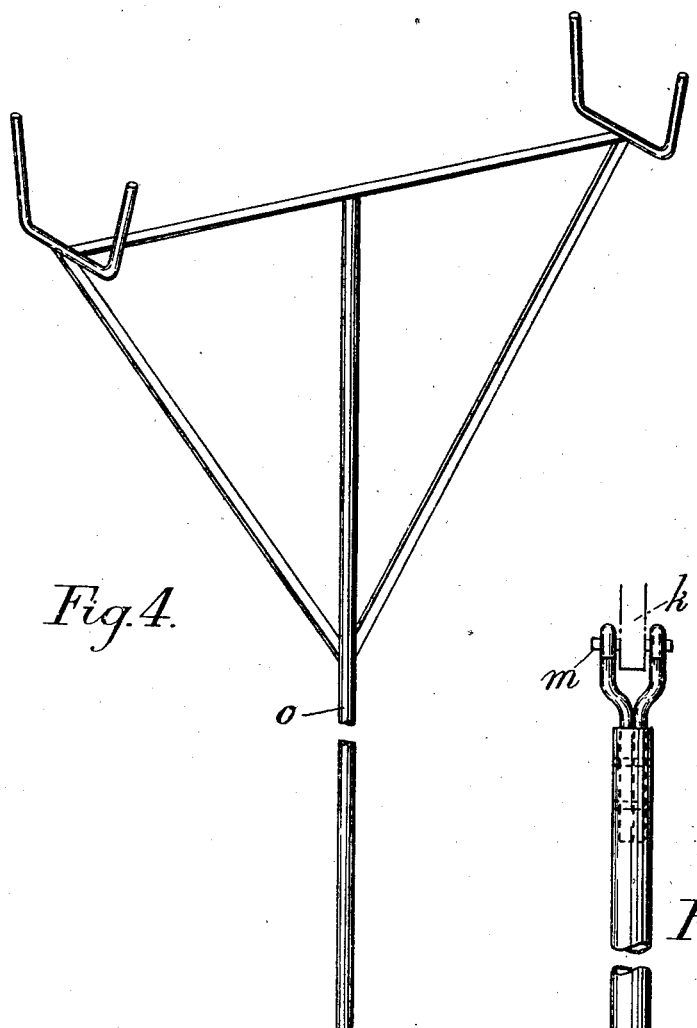
Figure 4 is a view showing in elevation a tool used to maintain the support in position while the bearer plates are being retracted for release of the centre.

In operation the support is placed on the ground, bottom uppermost (that is, in the position shown in Figure 1), and adjusted to the required length by a sliding action which is facilitated by the cam heads and carrying handles. The cams are operated to project the lips or tongues into the position shown in Figures 2 and 3 and the support is then lifted to the required position for use. In some cases the device may first be lifted into position and thereafter the cams operated by the hook-ended rods to project the lips or tongues. When the construction is completed and the support is to be removed it is first of all engaged by one or more operatives by means of a holding fork $o$ shown in Figure 4 (and which may, if desired, be telescopic) and a second operative then engages the cam-operating device by the hook-ended rod $n$ and rotates the cam to withdraw the tongue plate from the structure, it being understood that similar operations are then performed upon the other end of the support so as to permit of its complete removal.

In place of a cam or eccentric, I may provide ratchet, bevel or other gear, rack and pinion, or other mechanical means for operating the tongue plate.

It will be understood that the foregoing details are given purely by way of example to indicate the nature of the invention and not to limit its scope since I may vary the form and mode of construction of the support, and the means adopted for mounting and operating the tongue plate depending upon the purpose for which the support is to be employed or any practical requirements that may have to be fulfilled.

I claim:

1. An adjustable support of the kind referred to comprising a plurality of telescopic interfitting members, a metal plate at each end of the support slidable therein, a rotary cam member located in an aperture in each of said plates for sliding the same inwards and outwards relative to the support, and means extending outside the support for rotating each of said cams.

2. An adjustable support of the kind referred to as claimed in claim 1 having also a frame secured at each end of the support in which the plate-operating means is carried, and slides on said supports adjacent said frames for the reception of said plates.

3. An adjustable support of the kind referred to comprising a plurality of telescopic interfitting members, a frame secured to each end of the support, a bush in each of said frames, a shaft rotatably mounted in each of said bushes and extending therefrom, a rotary cam member secured to the inner end of each of said shafts, and a plate slidable in each end of said support and having an aperture embracing said cam member.

4. The structure of claim 3 having a pin passing transversely through the projecting end of each of said shafts for engagement by a suitable tool in order to rotate said shaft when the support is mounted in position.

WILLIAM ALPHONSE DE VIGIER.

REFERENCES CITED

The following references are of record in the file of this patent:

UNITED STATES PATENTS

| Number | Name | Date |
|---|---|---|
| 1,270,043 | Murphy | June 18, 1918 |
| 1,790,135 | Cuthbertson | Jan. 27, 1931 |
| 2,202,096 | Dell, et al. | May 28, 1940 |
| 1,792,815 | Chapin | Feb. 17, 1931 |